(12) United States Patent
Chung et al.

(10) Patent No.: US 10,919,472 B2
(45) Date of Patent: Feb. 16, 2021

(54) LOAD DISTRIBUTION STRUCTURE FOR VEHICLE

(71) Applicants: HYUNDAI MOTOR COMPANY, Seoul (KR); KIA MOTORS CORPORATION, Seoul (KR)

(72) Inventors: Hee Seouk Chung, Hwaseong-si (KR); Byeong Cheon Lee, Seoul (KR); Hyun Sik Kim, Seoul (KR); Deok Hwa Hong, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 78 days.

(21) Appl. No.: 16/394,224

(22) Filed: Apr. 25, 2019

(65) Prior Publication Data
US 2020/0148146 A1    May 14, 2020

(30) Foreign Application Priority Data
Nov. 13, 2018   (KR) .......................... 10-2018-0139318

(51) Int. Cl.
| | |
|---|---|
| *B60R 19/18* | (2006.01) |
| *B60R 19/34* | (2006.01) |
| *B62D 21/15* | (2006.01) |

(52) U.S. Cl.
CPC .............. *B60R 19/18* (2013.01); *B60R 19/34* (2013.01); *B62D 21/152* (2013.01); *B60R 2019/1806* (2013.01); *B60Y 2304/03* (2013.01); *B60Y 2304/05* (2013.01)

(58) Field of Classification Search
None
See application file for complete search history.

(56) References Cited

U.S. PATENT DOCUMENTS

| | | | |
|---|---|---|---|
| 6,209,948 B1 | 4/2001 | Mori et al. | |
| 6,460,918 B1* | 10/2002 | Sato ..................... | B62D 21/152 296/193.06 |
| 6,688,676 B1* | 2/2004 | Sato ..................... | B62D 21/152 296/187.05 |
| 6,817,657 B2 | 11/2004 | Watanabe et al. | |
| 6,866,115 B2 | 3/2005 | Miyasaka | |

(Continued)

FOREIGN PATENT DOCUMENTS

| | | |
|---|---|---|
| KR | 10-2006-0089759 A | 8/2006 |
| KR | 20170070749 A | 10/2017 |

*Primary Examiner* — Lori L Lyjak
(74) *Attorney, Agent, or Firm* — Brinks Gilson & Lione

(57) ABSTRACT

A load distribution structure for a vehicle includes: a pair of front side members which are spaced apart from each other in a width direction of the vehicle on a front side of the vehicle; a pair of side sills respectively connected to the front side members; a pair of front pillars respectively connected to front ends of the side sills; a pair of connection members each connecting the front side members and the corresponding side sill along a longitudinal direction of the vehicle; and a dash crossmember transversely connected to the pair of connection members. In particular, each front side member is overlapped and joined to the corresponding connection member, and end portions of the dash crossmember are overlapped and joined to the connection members, respectively.

10 Claims, 8 Drawing Sheets

(56) References Cited

U.S. PATENT DOCUMENTS

| | | | |
|---|---|---|---|
| 8,469,442 B1* | 6/2013 | Pencak | B62D 25/16 |
| | | | 296/187.12 |
| 9,988,100 B2 | 6/2018 | Kim et al. | |
| 2001/0030450 A1* | 10/2001 | Miyasaka | B62D 29/008 |
| | | | 296/204 |
| 2003/0141712 A1* | 7/2003 | Miyasaka | B62D 21/15 |
| | | | 280/784 |
| 2005/0082876 A1 | 4/2005 | Akasaka | |
| 2012/0248820 A1* | 10/2012 | Yasui | B60R 19/34 |
| | | | 296/187.09 |
| 2016/0059892 A1* | 3/2016 | Lee | B62D 25/025 |
| | | | 296/187.09 |
| 2017/0166258 A1 | 6/2017 | Kim et al. | |
| 2017/0203793 A1* | 7/2017 | Nakamura | B62D 25/082 |
| 2019/0106152 A1* | 4/2019 | Choi | B62D 25/088 |

* cited by examiner

LOAD DISTRIBUTION STRUCTURE FOR VEHICLE

CROSS-REFERENCE TO RELATED APPLICATION

This application claims priority to and the benefit of Korean Patent Application No. 10-2018-0139318, filed on Nov. 13, 2018, the entire contents of which are incorporated herein by reference.

FIELD

The present disclosure relates to a load distribution structure for a vehicle, which is capable of uniformly distributing an impact load.

BACKGROUND

The statements in this section merely provide background information related to the present disclosure and may not constitute prior art.

A pair of front side members are spaced apart from each other in a width direction of a vehicle on the front side of the vehicle, and a pair of side sills are connected to the pair of front side members, respectively. A front pillar (e.g., an A-pillar) is connected to the front end of each side sill.

The front side members extend along a longitudinal direction of the vehicle, and are directly affected by an impact load when a frontal collision occurs. The front side members are connected to the side sills through connection structures, respectively. The connection structure includes a plurality of members and a plurality of stiffeners to keep stiffness constant.

The inner side of the connection structure is connected to the front side member through flange coupling, and the outer side of the connection structure is connected to the front pillar (e.g., an A-pillar) through flange coupling.

A vehicle front structure according to the related art has a connection structure which is made up of approximately 24 members, including a plurality of members and a plurality of stiffeners, and thus its weight and manufacturing cost are increased.

In addition, we have discovered that since the connection structure in the vehicle front structure according to the related art is connected to a front side member and a front pillar through flange coupling, an impact load generated in the event of a frontal collision may not be efficiently distributed, and the connection structure may be easily deformed due to the impact load.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides a load distribution structure for a vehicle, capable of uniformly distributing an impact load generated in a frontal collision of the vehicle and significantly reducing weight and manufacturing cost.

According to an aspect of the present disclosure, a load distribution structure for a vehicle may include: a pair of front side members which are spaced apart from each other in a width direction of the vehicle and disposed on a front side of the vehicle; a pair of side sills respectively connected to the pair of front side members; a pair of front pillars respectively connected to front ends of the pair of side sills; a pair of connection members, each of which connects a front side member of the pair of front side members to a side sill of the pair of side sills along a longitudinal direction of the vehicle; and a dash crossmember transversely connected to the pair of connection members. In particular, each front side member of the pair of front side members may be overlapped and joined to a corresponding connection member of the pair of connection members, and end portions of the dash crossmember may be overlapped and joined to the pair of connection members, respectively.

Each connection member of the pair of connection members may have a first abutting wall to which a rear end surface of the front side member of the pair of front side members is overlapped and joined.

Each front side member of the pair of front side members may have a plurality of first reinforcing ribs extending horizontally, and the first abutting wall may be provided with a plurality of second reinforcing ribs extending horizontally. At least one first reinforcing rib of the plurality of first reinforcing ribs may be substantially flush with at least one second reinforcing rib of the plurality of second reinforcing ribs.

Each connection member of the pair of connection members may have a second abutting wall to which each end portion of the dash crossmember is overlapped and joined.

The plurality of second reinforcing ribs may connect the first abutting wall and the second abutting wall.

The plurality of second reinforcing ribs may lie at right angles to the first abutting wall and the second abutting wall.

Each connection member of the pair of connection members may have a bulkhead connecting between the first abutting wall and the second abutting wall, and the plurality of second reinforcing ribs may be connected to the bulkheads at right angles.

Each front pillar of the pair of front pillars may have a third abutting wall to which each end portion of the dash crossmember is overlapped and joined.

The load distribution structure may further include a dash panel connected between the pair of front pillars.

The dash crossmember may be disposed in front of the dash panel.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
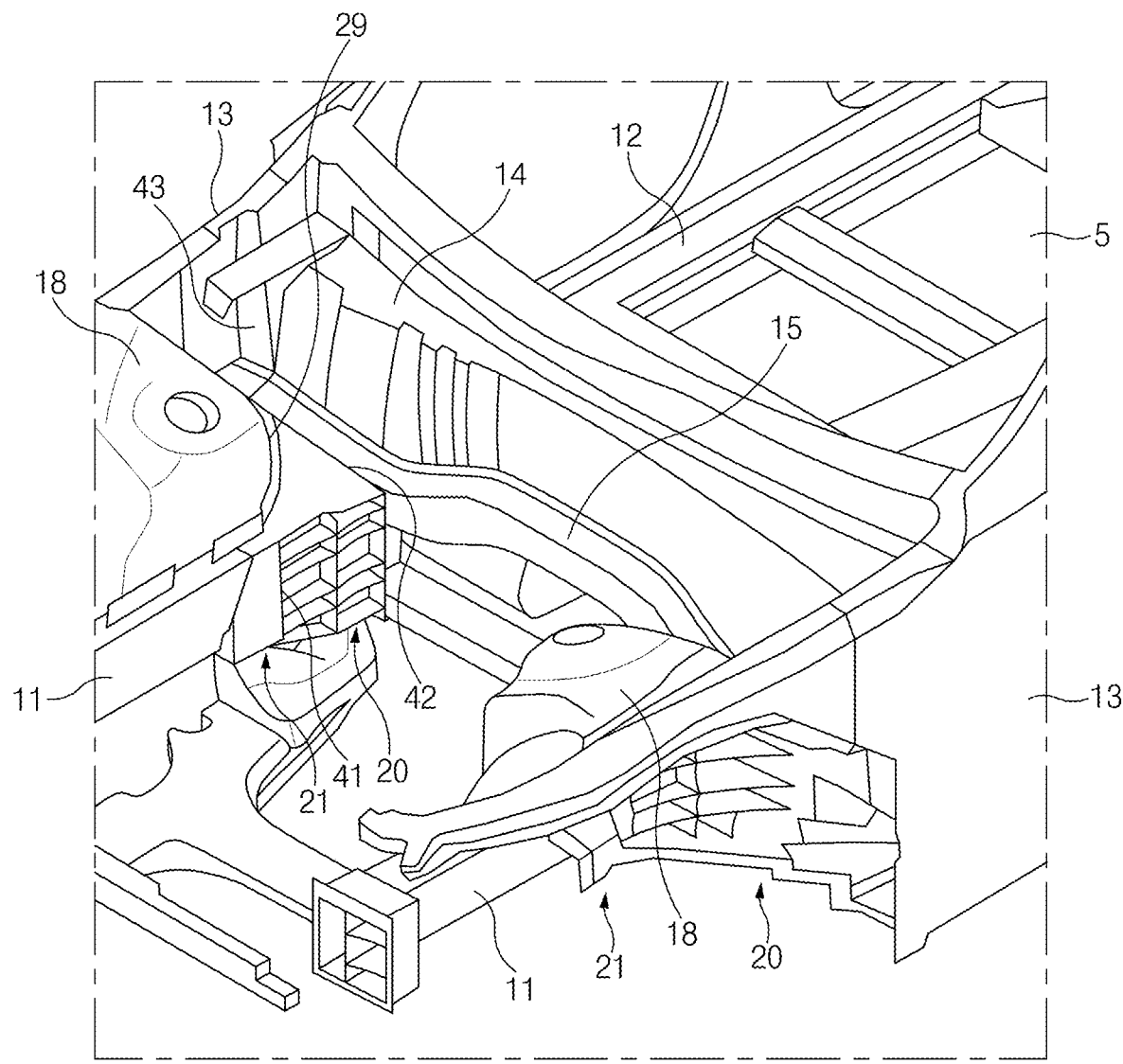
FIG. 1 illustrates a perspective view of a load distribution structure for a vehicle according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary forms of the present disclosure. These terms are only used to distinguish one element from another element, and the intrinsic features, sequence or order, and the like of the corresponding elements are not limited by the terms. Unless otherwise defined, all terms used herein, including technical or scientific teams, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
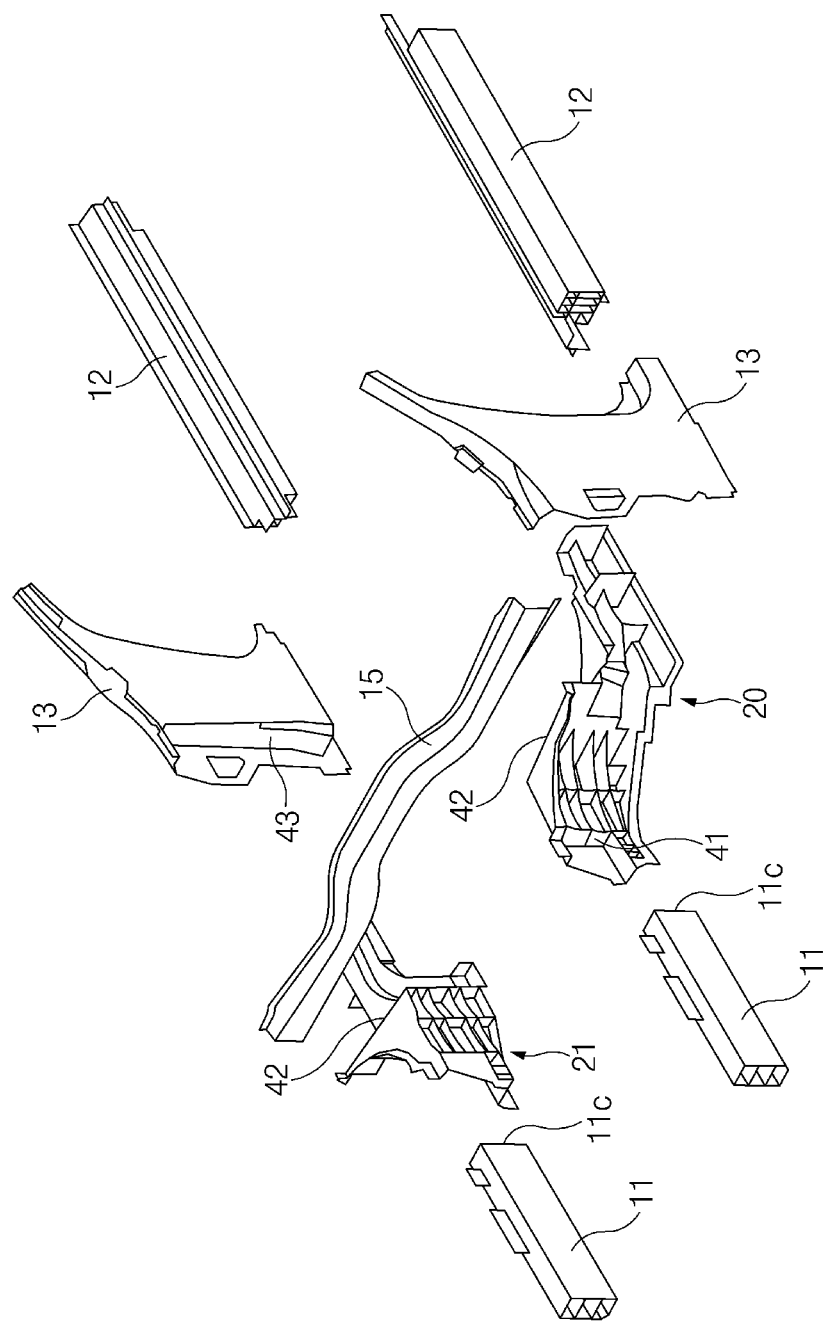
FIG. 2 illustrates an exploded perspective view of a load distribution structure for a vehicle according to an exemplary form of the present disclosure.

Referring to FIGS. 1 and 2, a load distribution structure 10 for a vehicle, according to an exemplary form of the present disclosure, may include: a pair of front side members 11 which are spaced apart from each other in a width direction of the vehicle and arranged on the front side of the vehicle; a pair of side sills 12 which are connected to the front side members 11, respectively; a pair of front pillars 13 which are connected to the side sills 12, respectively; and a pair of connection members 20 which connect the front side members 11 and the side sills 12 corresponding thereto in a longitudinal direction of the vehicle, respectively.

Figure 5:
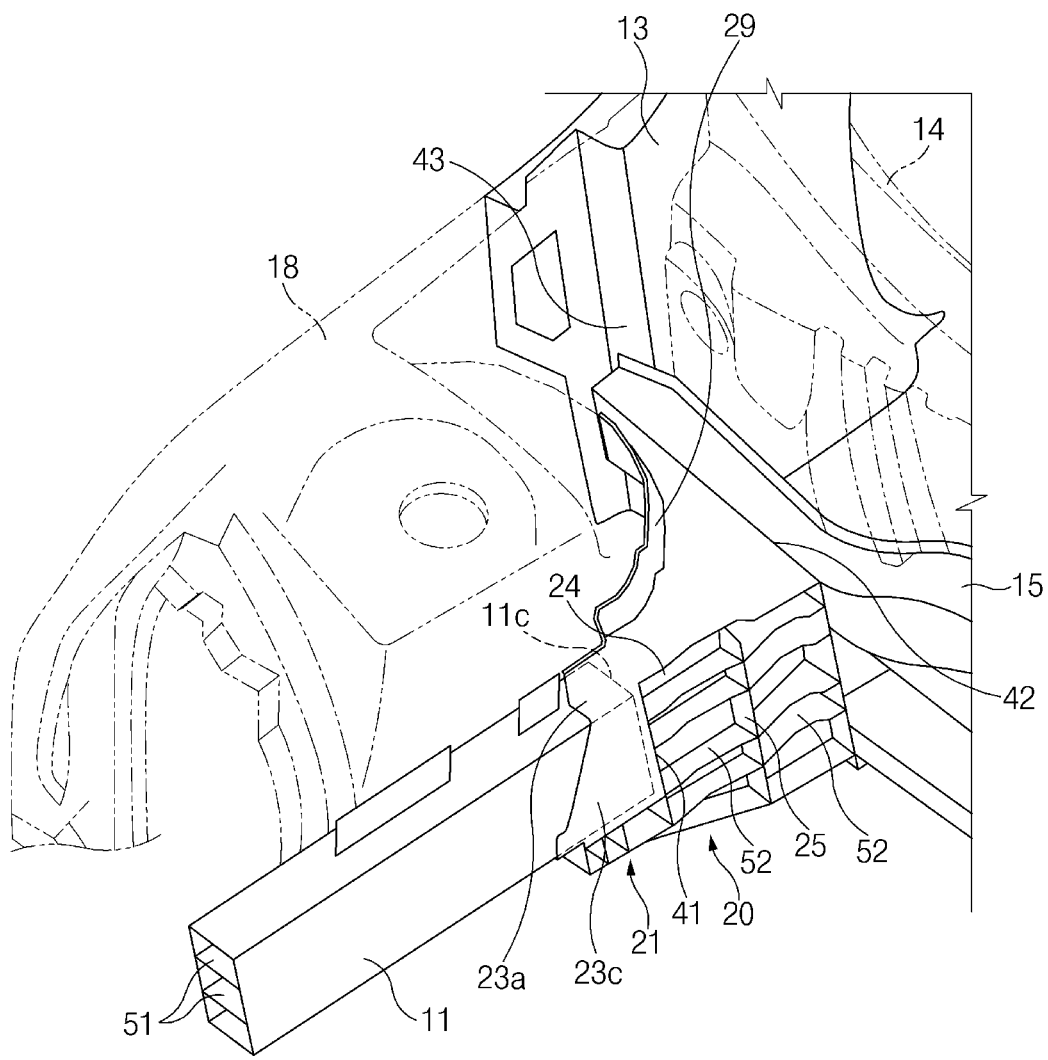
FIG. 5 illustrates a left-side perspective view of a load distribution structure for a vehicle according to an exemplary form of the present disclosure.
Figure 6:
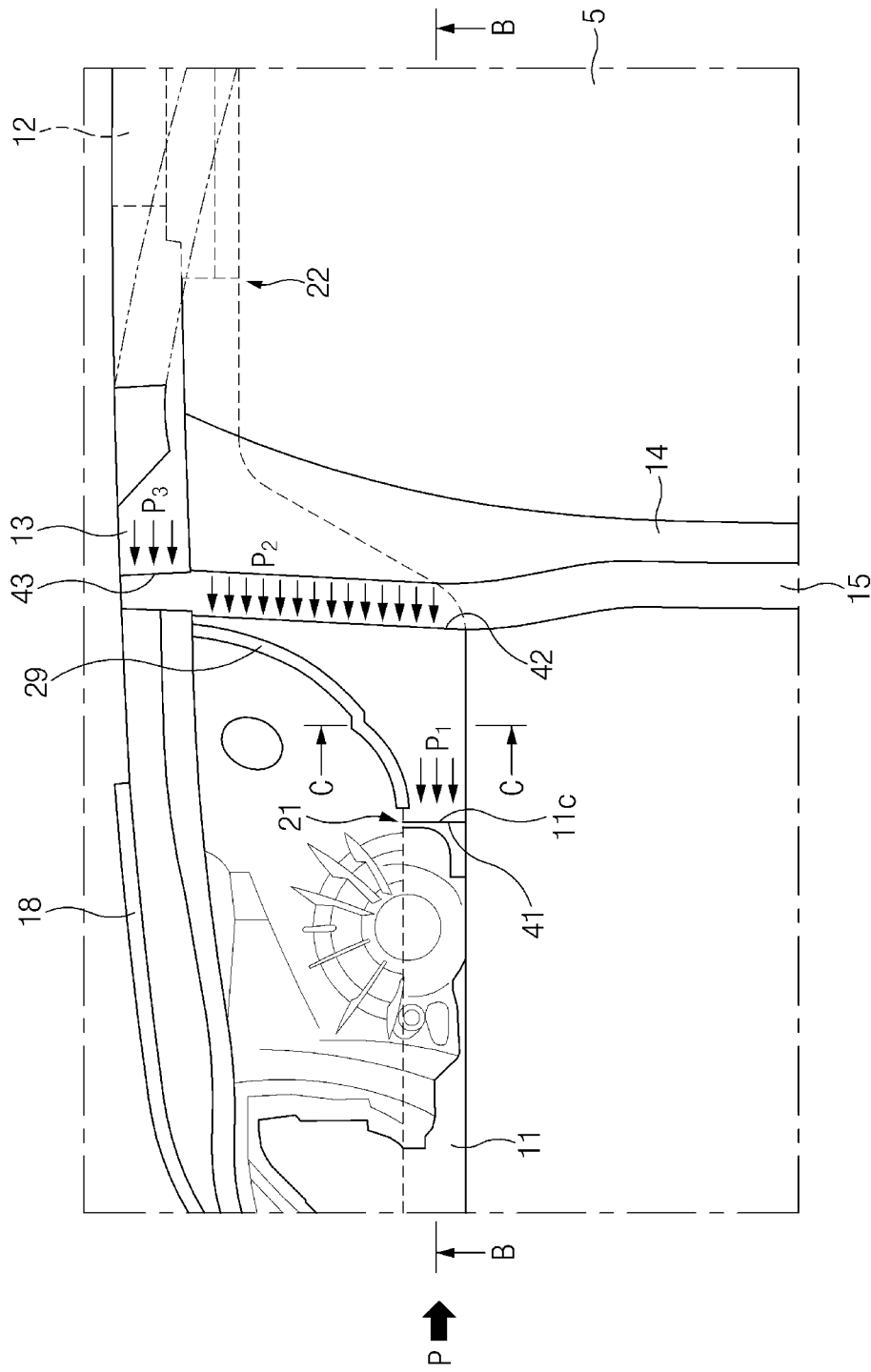
FIG. 6 illustrates a left-side plan view of a load distribution structure for a vehicle according to an exemplary form of the present disclosure.
Figure 7:
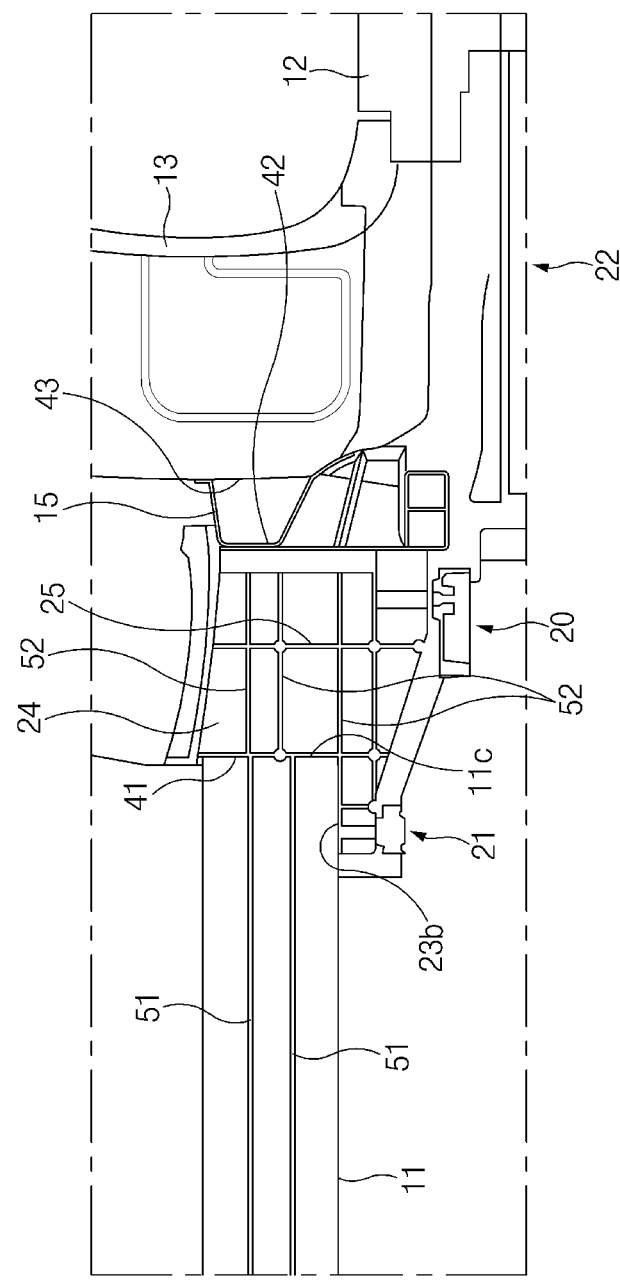
FIG. 7 illustrates a cross-sectional view taken along line B-B of FIG. 6.

The front side members 11 may extend along the longitudinal direction of the vehicle, each having a front end and a rear end. A bumper (not shown) may be connected between the front ends of the pair of front side members 11. The rear ends of the front side members 11 may be connected to the front ends of the side sills 12 through the connection members 20, respectively. As illustrated in FIGS. 5 and 7, each front side member 11 may have a plurality of first reinforcing ribs 51 extending along the longitudinal direction of the vehicle.

The side sills 12 may be connected to a floor 5 of the vehicle. The front ends of the side sills 12 may be connected to the rear ends of the front side members 20 through the connection members 20, respectively.

The front pillars 13 may be connected to the outer sides of the connection members 20 and the front ends of the side sills 12, respectively. A dash panel 14 may be connected between the pair of front pillars 13, and a dash crossmember 15 may be disposed in front of the dash panel 14. End portions of the dash crossmember 15 may be connected to the connection members 20 and the front pillars 13, respectively. Thus, an impact load transmitted through the pair of front side members 11 may be distributed by the dash crossmember 15.

Figure 3:
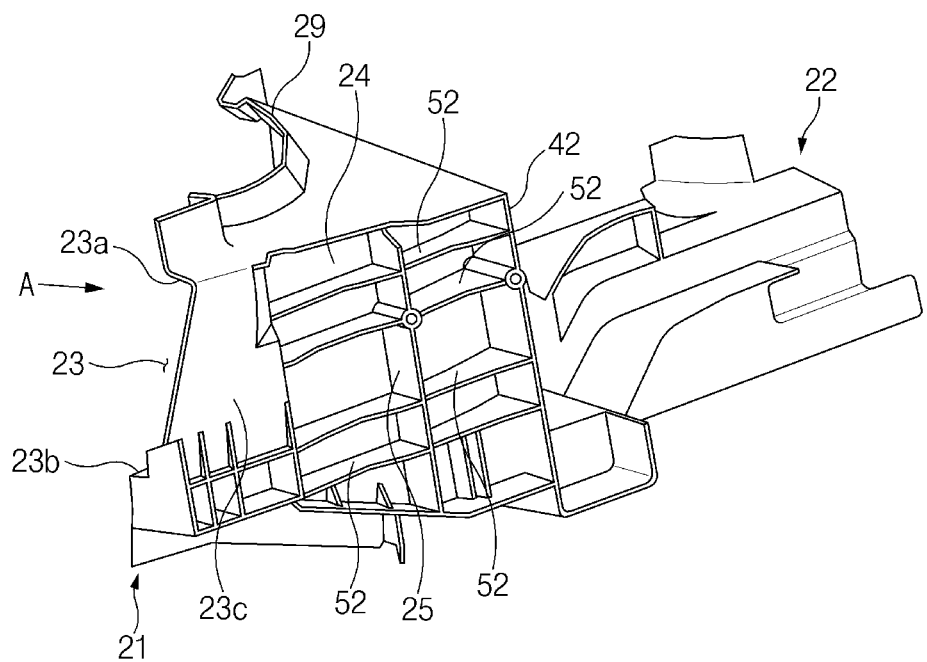
FIG. 3 illustrates a perspective view of a connection member in a load distribution structure for a vehicle according to an exemplary form of the present disclosure.

As illustrated in FIGS. 2 and 3, each connection member 20 may include a first connecting portion 21 to which the rear end of the front side member 11 is connected, and a second connecting portion 22 to which the front end of the side sill 12 is connected.

Each connection member 20 may have a first abutting wall 41 to which a rear end surface 11c of the front side member 11 is overlapped and joined, and a second abutting wall 42 to which each end portion of the dash crossmember 15 is overlapped and joined.

The first connecting portion 21 may have a receiving space 23 which receives the rear end of the front side member 11, and the receiving space 23 may be provided in the front end of the first connecting portion 21. The receiving space 23 may be defined by the first abutting wall 41, an upper wall 23a, a lower wall 23b, and sidewalls 23c.

A front surface of the first abutting wall 41 may contact the rear end surface 11c of the front side member 11. In particular, the front surface of the first abutting wall 41 and the rear end surface 11c of the front side member 11 may be joined by butt-welding. That is, the rear end of the front side member 11 may be overlapped and joined to the first abutting wall 41 of the connection member 20. When an impact load P generated in a frontal collision of the vehicle is transmitted to the first abutting wall 41 through the front side member 11, a reaction force P1 may be exerted by the rear end surface 11c of the front side member 11 and the first abutting wall 41, and thus part of the impact load P may be primarily absorbed by the connection member 20 so that part of the impact load P may be primarily eliminated. The rest of the impact load P may be transmitted to the dash crossmember 15 through the connection member 20.

The second abutting wall 42 may be formed between the first connecting portion 21 and the second connecting portion 22, and a front surface of each end portion of the dash crossmember 15 may be in surface contact with the second abutting wall 42. The front surface of the end portion of the dash crossmember 15 may be joined to the second abutting wall 42 by butt-welding. That is, the dash crossmember 15 may be overlapped and joined to the second abutting wall 42 of the connection member 20. When part of the impact load P, which is not absorbed by the connection member 20 and eliminated, is transmitted to the second abutting wall 42 and the end portion of the dash crossmember 15 through the connection member 20, a reaction force P2 may be exerted by the dash crossmember 15 and the second abutting wall 42, and thus part of the impact load P may be secondarily absorbed by the dash crossmember 15 so that part of the impact load P may be secondarily eliminated. The rest of the impact load P may be transmitted to the front pillar 13 through the dash crossmember 15.

Each connection member 20 may have a flange 29 to which a portion of a damper housing 18 is joined, and a suspension (not shown) may be connected to the damper housing 18. In this manner, the connection member 20 may support the front side member 11 and the damper housing 18, thereby effectively preventing the impact load from being transmitted to a passenger compartment of the vehicle during the frontal collision of the vehicle.

Figure 4:
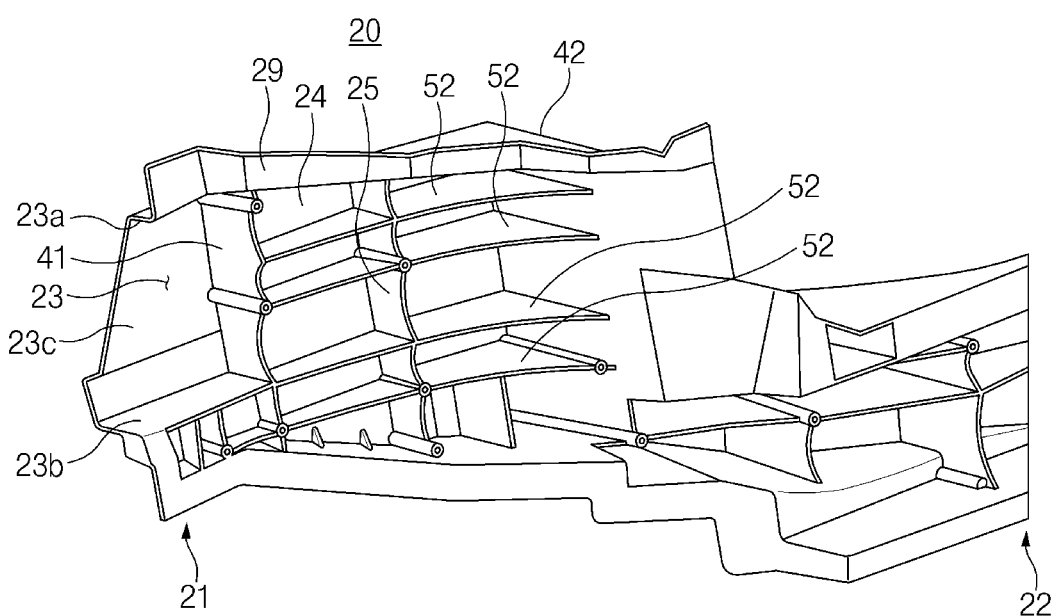
FIG. 4 illustrates a perspective view in a direction of arrow A of FIG. 3.
Figure 8:
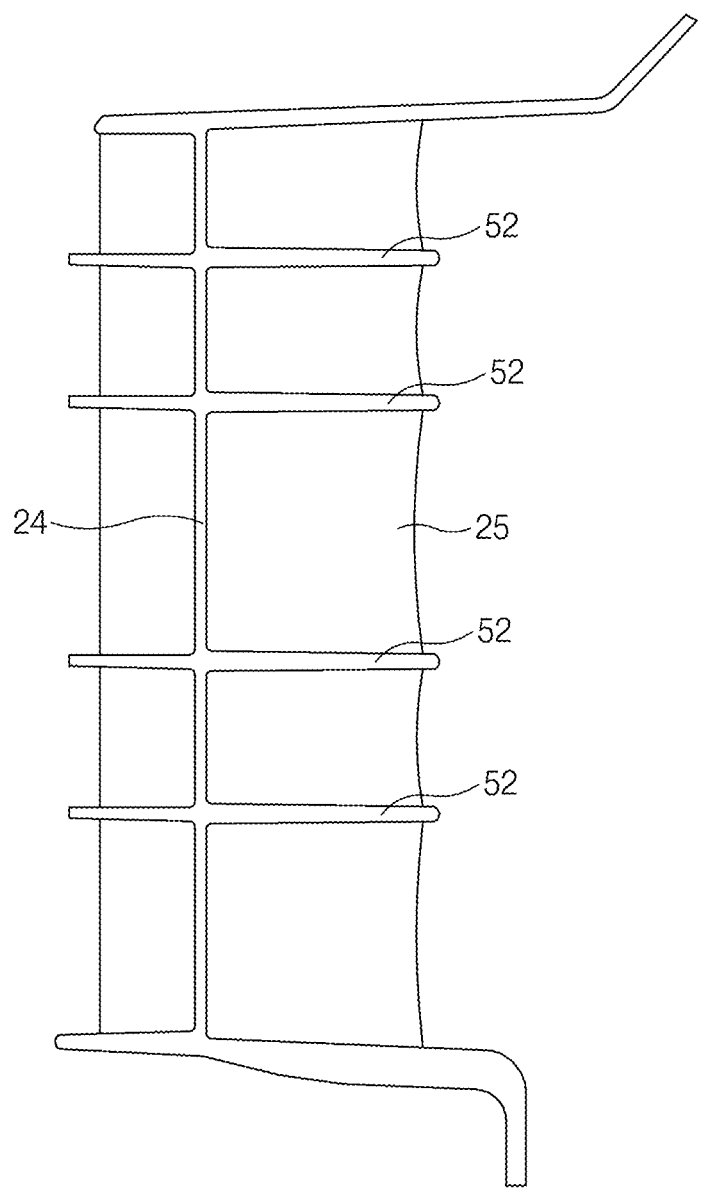
FIG. 8 illustrates a cross-sectional view taken along line C-C of FIG. 6.

As illustrated in FIGS. 3, 4, and 8, the connection member 20 may have a bulkhead 24 connecting between the first abutting wall 41 and the second abutting wall 42, and an internal space of the connection member 20 may be divided by the bulkhead 24 into a section facing the interior space of the vehicle and a section facing the outside of the vehicle.

A vertical rib 25 may be connected to the center of the bulkhead 24. The vertical rib 25 may lie at right angles to the bulkhead 24, and the vertical rib 25 may extend vertically. The internal space of the connection member 20 may be divided by the vertical rib 25 into a section facing the first abutting wall 41 and a section facing the second abutting wall 42.

In addition, the connection member 20 may have a plurality of second reinforcing ribs 52 extending horizontally. The plurality of second reinforcing ribs 52 may be connected to the vertical rib 25 at right angles as illustrated in FIGS. 3 and 4, and be connected to the bulkhead 24 at right angles as illustrated in FIG. 8. Each second reinforcing rib 52 may connect between the first abutting wall 41 and the second abutting wall 42, and may extend through the vertical rib and the bulkhead 24. In particular, the plurality of second reinforcing ribs 52 may lie at right angles to the first and second abutting walls 41 and 42 so that the impact load transmitted from the first abutting wall 41 to the second abutting wall 42 may be easily distributed and absorbed.

According to an exemplary form, as illustrated in FIG. 7, at least one first reinforcing rib 51 among the plurality of first reinforcing ribs 51 may be substantially flush with at least one second reinforcing rib 52 among the plurality of second reinforcing ribs 52. Thus, the impact load transmitted to the rear end surface 11c of the front side member 11 and the first abutting wall 41 may be distributed and absorbed more efficiently.

The connection member 20 may be a cast product that is produced by casting, so the bulkhead 24, the second reinforcing ribs 52, the vertical rib 25, the first abutting wall 41, the second abutting wall 42, and the like may be formed as a unitary one-piece structure.

The front pillar 13 may have a third abutting wall 43 formed at the front thereof, and a rear surface of each end portion of the dash crossmember 15 may contact a front surface of the third abutting wall 43. The rear surface of the end portion of the dash crossmember 15 and the third abutting wall 43 may be joined by butt welding. That is, the dash crossmember 15 may be overlapped and joined to the third abutting wall 43 of the front pillar 13. When part of the impact load P, which is not absorbed by the dash crossmember 15 and eliminated, is transmitted to the third abutting wall 43 and the end portion of the dash crossmember 15 through the dash crossmember 15, a reaction force P3 may be exerted by the dash crossmember 15 and the third abutting wall 43, and thus part of the impact load P may be thirdly absorbed by the front pillar 13 so that part of the impact load P may be thirdly eliminated. Then, the rest of the impact load P may be transmitted to the side sill 12 through the second connecting portion 22 of the connection member 20.

According to the above-described exemplary forms of the present disclosure, the front side member 11 may be overlapped and joined to the first abutting wall 41 of the connection member 20, the dash crossmember 15 may be overlapped and joined to the second abutting wall 42 of the connection member 20, and the dash crossmember 15 may be overlapped and joined to the third abutting wall 43 of the front pillar 13 so that the impact load generated in the frontal collision of the vehicle may be uniformly distributed and absorbed, and vehicle crashworthiness may be significantly improved.

In addition, according to the exemplary forms of the present disclosure, one connection member 20 may be configured to connect the front side member 11, the dash crossmember 15, the front pillar 13, and the side sill 12 so that the number of components may be significantly reduced, compared to the related art. Thus, the weight (approximately −1.8 kg/each) and manufacturing cost (reduced by 40%) of the load distribution structure may be significantly reduced.

As set forth above, the load distribution structure according to exemplary forms of the present disclosure may allow the front side member and the dash crossmember to be overlapped and joined to the connection member 20, thereby uniformly distributing and absorbing the impact load generated in the frontal collision of the vehicle, and significantly improving the vehicle crashworthiness.

In addition, the load distribution structure according to exemplary forms of the present disclosure may significantly reduce the number of its components compared to the related art, thereby significantly reducing the weight and manufacturing cost thereof.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A load distribution structure for a vehicle, the load distribution structure comprising:
   a pair of front side members which are spaced apart from each other in a width direction of the vehicle and disposed on a front side of the vehicle;
   a pair of side sills respectively connected to the pair of front side members;
   a pair of front pillars respectively connected to front ends of the pair of side sills;
   a pair of connection members, each of which connects a front side member of the pair of front side members to a side sill of the pair of side sills along a longitudinal direction of the vehicle; and
   a dash crossmember transversely connected to the pair of connection members,
   wherein each front side member of the pair of front side members is overlapped and joined to a corresponding connection member of the pair of connection members, and
   end portions of the dash crossmember are overlapped and joined to the pair of the connection members, respectively.

2. The load distribution structure according to claim 1, wherein each connection member of the pair of connection members has a first abutting wall to which a rear end surface of the front side member of the pair of front side members is overlapped and joined.

3. The load distribution structure according to claim 2, wherein each front side member of the pair of front side members has a plurality of first reinforcing ribs extending horizontally,
 the first abutting wall is provided with a plurality of second reinforcing ribs extending horizontally, and
 at least one first reinforcing rib of the plurality of first reinforcing ribs is substantially flush with at least one second reinforcing rib of the plurality of second reinforcing ribs.

4. The load distribution structure according to claim 3, wherein each connection member of the pair of connection members has a second abutting wall to which each end portion of the dash crossmember is overlapped and joined.

5. The load distribution structure according to claim 4, wherein the plurality of second reinforcing ribs connect the first abutting wall and the second abutting wall.

6. The load distribution structure according to claim 5, wherein the plurality of second reinforcing ribs lie at right angles to the first abutting wall and the second abutting wall.

7. The load distribution structure according to claim 6, wherein each connection member of the pair of connection members has a bulkhead connecting between the first abutting wall and the second abutting wall, and
 the plurality of second reinforcing ribs are connected to the bulkheads at right angles.

8. The load distribution structure according to claim 1, wherein each front pillar of the pair of front pillars has a third abutting wall to which each end portion of the dash crossmember is overlapped and joined.

9. The load distribution structure according to claim 1, further comprising a dash panel connected between the pair of front pillars.

10. The load distribution structure according to claim 9, wherein the dash crossmember is disposed in front of the dash panel.

* * * * *